United States Patent
Ringland et al.

(10) Patent No.: US 10,892,965 B2
(45) Date of Patent: Jan. 12, 2021

(54) DATA NETWORK MANAGEMENT

(71) Applicant: BRITISH TELECOMMUNICATIONS PUBLIC LIMITED COMPANY, London (GB)

(72) Inventors: Simon Patrick Alexander Ringland, London (GB); Francis James Scahill, London (GB); Richard Joseph Evenden, London (GB)

(73) Assignee: British Telecommunications Public Limited Company, London (GB)

( * ) Notice: Subject to any disclaimer, the term of this patent is extended or adjusted under 35 U.S.C. 154(b) by 60 days.

(21) Appl. No.: 15/026,199

(22) PCT Filed: Sep. 30, 2014

(86) PCT No.: PCT/GB2014/000390
§ 371 (c)(1),
(2) Date: Mar. 30, 2016

(87) PCT Pub. No.: WO2015/044634
PCT Pub. Date: Apr. 2, 2015

(65) Prior Publication Data
US 2016/0241452 A1  Aug. 18, 2016

(30) Foreign Application Priority Data
Sep. 30, 2013  (EP) .................................... 13250104

(51) Int. Cl.
*H04L 12/26* (2006.01)
*H04L 12/24* (2006.01)
(Continued)

(52) U.S. Cl.
CPC ........ *H04L 43/0817* (2013.01); *H04L 41/082* (2013.01); *H04L 45/24* (2013.01); *H04W 24/02* (2013.01)

(58) Field of Classification Search
CPC ... H04L 41/082; H04L 41/0806; H04L 45/24; H04L 45/50; H04L 45/66; H04L 45/586;
(Continued)

(56) References Cited

U.S. PATENT DOCUMENTS 6,529,479 B1  3/2003  Suzuki
6,597,689 B1  7/2003  Chiu et al.
(Continued)

FOREIGN PATENT DOCUMENTS

EP  2451119 A1  5/2012
EP  2536068 A1  12/2012
(Continued)

OTHER PUBLICATIONS

Access Node Control Protocol (ancp), Feb. 25, 2016, 5 pages.
(Continued)

*Primary Examiner* — Un C Cho
*Assistant Examiner* — Rasha K Fayed
(74) *Attorney, Agent, or Firm* — Patterson Thuente Pedersen, P.A.

(57) ABSTRACT

In a network of data devices having routing functions, a controller within the network core is arranged to monitor the status and capabilities of each data device and to check for the availability of network functions which alter the capabilities of the data devices. The controller changes the configuration of the data devices to gain the new functionality, or alters the routing behavior so that certain control data packets are forwarded to a function processor which performs processing on behalf of the data devices in a proxy manner. The function processor provides virtual functions to the data devices.

8 Claims, 4 Drawing Sheets

(51) Int. Cl.
*H04L 12/707* (2013.01)
*H04W 24/02* (2009.01)

(58) Field of Classification Search
CPC ......... H04L 45/28; H04L 45/00; H04L 45/02; H04L 45/04; H04L 45/124; H04L 45/12; H04L 45/125; H04L 43/0817; H04L 67/1002; H04L 67/125; H04L 67/1027; H04L 67/14; H04L 61/2061; H04L 61/6022; H04L 61/1517; H04L 61/2015; H04L 12/56; H04L 12/707; H04L 12/26; H04L 12/24; H04L 49/90; H04L 49/9057; H04L 47/30; H04W 24/02
USPC ....... 370/254, 392, 351, 229, 216, 401, 238, 370/242; 709/228, 238, 248, 220
See application file for complete search history.

(56) References Cited

U.S. PATENT DOCUMENTS

| | | | |
|---|---|---|---|
| 7,969,968 B2* | 6/2011 | De Luca | H04L 63/306 370/352 |
| 8,079,073 B2* | 12/2011 | Roberts | H04L 63/0218 726/11 |
| 8,121,126 B1* | 2/2012 | Moisand | H04L 45/50 370/392 |
| 8,121,145 B2* | 2/2012 | Hafeez | H04W 74/0875 370/461 |
| 2002/0196793 A1 | 12/2002 | Samba | |
| 2003/0216143 A1 | 11/2003 | Roese et al. | |
| 2006/0190570 A1 | 8/2006 | Booth | |
| 2007/0025371 A1* | 2/2007 | Krantz | H04W 48/08 370/401 |
| 2008/0013523 A1* | 1/2008 | Nambakkam | H04M 7/0075 370/352 |
| 2009/0031008 A1* | 1/2009 | Elliott | H04L 61/1517 709/220 |
| 2009/0034556 A1* | 2/2009 | Song | H04H 20/57 370/471 |
| 2009/0063689 A1 | 3/2009 | Camille | |
| 2009/0263132 A1 | 10/2009 | Rafel et al. | |
| 2010/0086119 A1* | 4/2010 | De Luca | H04M 3/2281 379/213.01 |
| 2010/0131660 A1* | 5/2010 | Dec | H04L 67/1002 709/228 |
| 2010/0180016 A1 | 7/2010 | Bugwadia et al. | |
| 2010/0182983 A1 | 7/2010 | Herscovici et al. | |
| 2010/0202441 A1 | 8/2010 | Haag et al. | |
| 2010/0223164 A1 | 9/2010 | Fortier | |
| 2011/0191467 A1* | 8/2011 | Imbimbo | H04L 61/2582 709/224 |
| 2012/0122424 A1 | 5/2012 | Herscovici et al. | |
| 2012/0170470 A1* | 7/2012 | Duchenay | H04L 61/6054 370/252 |
| 2013/0108264 A1* | 5/2013 | deRuijter | H04Q 3/0083 398/45 |
| 2014/0222978 A1* | 8/2014 | Donley | H04L 61/2015 709/220 |
| 2014/0245405 A1 | 8/2014 | Ye | |
| 2014/0258478 A1* | 9/2014 | Moghe | H04L 63/0209 709/220 |
| 2014/0321417 A1* | 10/2014 | Yang | H04W 72/0406 370/329 |
| 2016/0204956 A1 | 7/2016 | Linney et al. | |

FOREIGN PATENT DOCUMENTS

EP 2624507 A1 8/2013
WO WO 2007/140337 A1 12/2007

OTHER PUBLICATIONS

Ooghe et al., "Framework and Requirements for an Access Node Control Mechanism in Broadband Multi-Service Networks", May 2010, 47 pages.
Wadhwa et al., "Protocol for Access Node Control Mechanism in Broadband Networks", Oct. 2011, 82 pages.
Bitar et al., "Applicability of the Access Node Control Mechanism to Broadband Networks Based on Passive Optical Networks (PONs)", Jun. 2013, 39 pages.
Welch et al., "Layer 2 Control Mechanism for Broadband Multi-Service Architectures part II", Nov. 2012, 38 pages.
International Search Report and Written Opinion, for PCT Application No. PCT/GB2014/000349, dated Nov. 10, 2014, 4 pages.
International Preliminary Report on Patentability, for PCT Application No. PCT/GB2014/000349, dated Dec. 11, 2015, 13 pages.
Application and File History for U.S. Appl. No. 14/916,829, filed Mar. 4, 2016. Inventors: Linney et al.
Mitton, Networking Working Group, *Network Access Server Requirements Next Generation (NASREQNG) NAS Model*, Jul. 2000, 20 pages.
International Search Report for PCT/GB2014/000390, dated Dec. 12, 2014, 3 pages.
Written Opinion of the International Searching Authority for PCT/GB2014/000390, dated Dec. 12, 2014, 7 pages.

* cited by examiner

DATA NETWORK MANAGEMENT

PRIORITY CLAIM

The present application is a National Phase entry of PCT Application No. PCT/GB2014/000390, filed Sep. 30, 2014, which claims priority from EP Application No. 13250104 0, filed Sep. 30, 2013, each of which is hereby fully incorporated herein by reference.

TECHNICAL FIELD

Embodiments relate to broadband connectivity and in particular to a method of managing network nodes in a data network.

BACKGROUND

In recent times, Internet Service Providers (ISPs) have been established to provide broadband services and network infrastructure to allow customers to connect to Wide Area Networks (WANs) such as the Internet.

Typically, the ISP network can be divided into the core network services, customer facing interface and a gateway to the external WAN. The ISP's network is arranged so that the gateway link can be shared between all the customers rather than each customer having a dedicated link.

Since the customers need to be physically connected to the ISP's core network for data connectivity, the customer facing interface section includes any routing device in the customer's premises, any electrical/optical line connection to the core network (typically based on a variant of the Digital Subscriber Line (xDSL) technologies or cable technologies such as DOCSIS), and any termination equipment. Within the core network, the ISP will include network management services, user authentication functions, etc.

Whilst the ISP's customer facing equipment is concerned with transferring data to/from customer premises equipment to the ISP core network over large distances, the customer equipment within a customer's premises (home or business) is responsible for sharing the ISP broadband link into the house/customer premises, between any computing devices such as computers, smartphones, tablets, etc., and are referred to a routers. Access points typically contain Ethernet interfaces to allow data enabled devices to share the WAN connection using a wired connection. Increasingly, routers also include interfaces based on the IEEE 802.11 family of Wi-Fi wireless protocols such as 802.11n to allow wireless communication between wireless devices and the router. Hereinafter these wireless routers will be referred to as access points (AP).

Due to the diverse control and cost requirements and internal structures of the ISPs, a number of different architectures for access points (APs) have been developed.

1. Standalone AP
In the standalone AP, all the functions required to provide control logic such as Wi-Fi access are provided in a single unit.
2. Controller Based AP
In a controller based AP, a lightweight (in the sense of cost and functionality) AP provides the physical wireless interface and implements time critical functions. Meanwhile an AP controller in the network core provides the remaining functions of the access point centrally for a number of APs. There are a number of variations on this approach, which apportion functions differently between the controller and the AP. (e.g. Local MAC puts more functions in the AP than Split MAC variants).

The standalone AP architecture provides the customer with the most control to tailor the AP for their own premises requirements and reduce the management requirements required in the ISP's network core. In contrast, the controller based AP architecture requires additional resources within the ISP core, but allows the ISP to have greater control of the services offered to customers.

An example of a service is a concept known as Community Wi-Fi.

Some APs can provide two co-located wireless networks in a surrounding area of the AP so that there are both private and public wireless networks for the same AP. The access points provide private access (including access to both the local LAN and the internet) through a "private side" SSID, whilst providing public access to only the internet for the public users through a "public side" SSID. Such a configuration can improve the security of that customer's network by separating "home" and "visiting" users. However, not all users will wish to, or know how to, setup such a configuration.

Community Wi-Fi extends this concept by allowing the ISP to configure the APs of their customers to create the private and public wireless networks and restricting the public wireless networks access to other customers of the same ISP. Since the ISPs customers are spread over a large geographical area, this configuration allows the customers to access the community Wi-Fi and therefore have internet connectivity without charge even when they are not at home. The ISP maintains a list of the AP devices in the community and user authentication services within the network core. These communities have become very large. For example the BT Wi-Fi community network has over 5 million access points.

Whilst controller based architecture would appear to be most suitable for community Wi-Fi, in practice, scaling problems limit its deployment. Therefore community Wi-Fi using standalone APs devices is currently more common. A central authentication server is provided in the core to verify any users attempting to connect the community Wi-Fi architecture. However with such a large base of "Community Wi-Fi" access points, there are inevitably many generations and variants in the deployed access point devices. Different devices will have different capabilities and therefore to maintain consistency across the community Wi-Fi network, there are either inconsistencies in the service offered by the individual APs forming the community Wi-Fi network or the system policy is to operate the APs at the lowest common level of functionality which can result in unused resources within the hardware.

SUMMARY

Embodiments substantially address the above issues.

In one aspect, an embodiment provides a data network comprising: at least one routing device and a routing configuration controller, wherein the routing configuration controller is operable to determine the processing capabilities of the at least one routing device and to configure the at least one routing device in accordance with the determined capabilities to change the configuration of the at least one routing device.

In an embodiment, and advantageously, the configuration of the at least one routing device results in the new capabilities for the at least one routing device.

In an embodiment, and advantageously, the data network includes a control data processor, wherein the routing configuration controller configures the at least routing device to forward a subset of control data to the control data processor, and the control data processor functions as a proxy to process the subset of control data on behalf of the at least one routing device.

Whilst new capabilities can be added by changing the configuration of the routing device, for certain capabilities which are more computational, the control data processor performs the processing on behalf of the routing device and therefore provides additional virtual capabilities for the at least one routing device.

In an embodiment, and advantageously, the configuration of the at least one routing device is dynamically changed whenever the routing configuration control determines new functions are available.

In an embodiment, and advantageously, the at least one routing device includes a wireless interface for wireless communication with wireless client devices.

In an embodiment, and advantageously, there are at least two routing devices having different processing capabilities, the routing configuration controller determining the respective capabilities and configuring each device to have a respective set of new capabilities.

In an embodiment, and advantageously, the routing configuration controller detects the presence of new routing devices and determines the respective configurations of the new routing devices.

In another aspect, embodiments provide a routing device having a set of internal functions, and a receiver for receiving updated packet filtering commands and routing functions so as to gain new functions.

In another aspect, an embodiment provides a network controller suitable for configuring devices in the network set out above.

Other advantageous aspects are set out in the dependent claims.

BRIEF DESCRIPTION OF THE DRAWINGS

Embodiments will now be described with reference to the accompanying figures in which.

DETAILED DESCRIPTION

Figure 1:
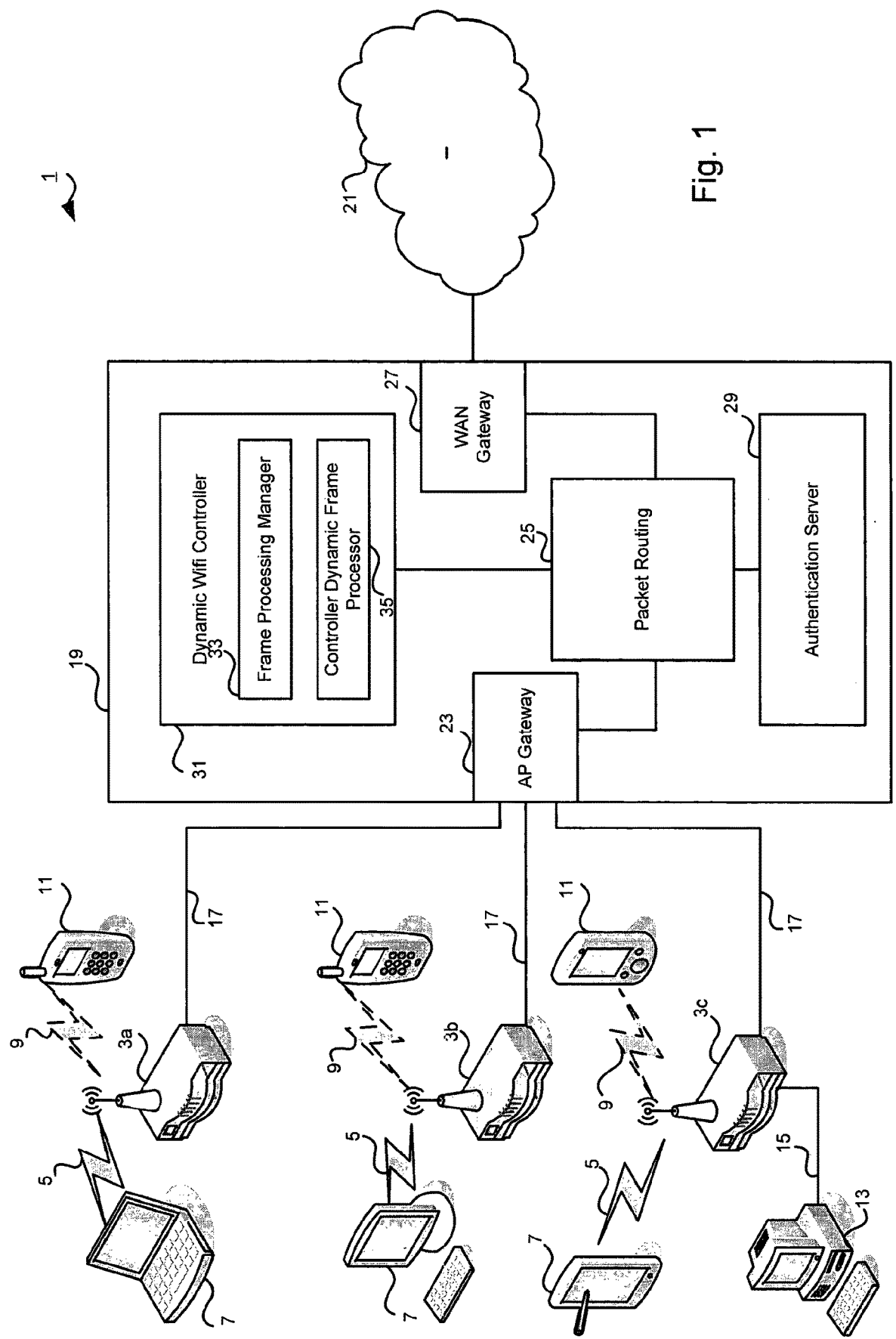
FIG. 1 shows an overview of a system according to a first embodiment.

FIG. 1 shows an overview of a network architecture of a system 1 according to the first embodiment. Access points 3 located at a customer premises provide connectivity for local devices. In this embodiment, the access points have wireless interfaces compliant with protocols such as 802.11n and 802.11ac and wired Ethernet interfaces.

In particular, the wireless interface is arranged to create a private side wireless network 5 having a private side SSID name for private side authorized devices 7. This would typically be a customer's home devices. The wireless interface also creates a public side wireless network 9 (shown in dashed lines). This public side wireless network 9 is for other devices 11 which belong to other customers of the community Wi-Fi network. For example, a device IIa connected to the public side wireless network 9 of access point 3a belongs to the owner of access point 3b.

Furthermore, wired devices such as desktop computers 13 can connect to the access points 3 using Ethernet 15.

The access points 3 function as data termination points for wireless and wired data packets and furthermore contain routing functions for sending the data towards their destination such as over the broadband connection 17 based on xDSL or cable and subsequently via an ISP's core network 19 to communicate with services located on a wide area network such as the Internet 21.

Network Core

The components of the network core 19 include an AP gateway 23, packet routing function 25, a WAN gateway 27, an authentication server 29 and a dynamic Wi-Fi controller 31.

The AP gateway 23 serves to send and receive data between the network core 19 and each of the APs3.

The packet routing function 25 directs data packets received from the AP gateway towards their destination. In particular, in this embodiment, data plane packets from the APs 3 are forwarded to the WAN gateway 27 and vice versa for packets from the Internet 21.

Control plane packets such as authentication exchanges are either handled locally in the AP 3, or forwarded to the authentication server 29. As described below, other types of control plane packets related to routing and configuration are handled locally or are forwarded to the dynamic Wi-Fi Controller 31.

The dynamic Wi-Fi controller 31 is responsible for managing the APs 3 and in particular to determine the capabilities of each AP 3 and then supplement each AP 3 with the missing functions offered in the network. Any functions which can be performed by the AP 3 are carried out locally. Typically older APs 3 will require more functions to be performed by the Dynamic controller 31 than newer APs 3.

As will be explained below, a Frame processing manager 33 within the Dynamic Wi-Fi controller 31 is responsible for dynamically managing the functions of the APs 3. The frame processing manager 33 maintains valid status information about each connected AP 3 and its capabilities and configures the APs 3 so that functionality is dynamically split/ between the AP 3 and the Controller Dynamic Frame Processor 35 which carries out any controller side functions on behalf of the AP 3 and then forwards the result to the AP 3 where appropriate. In this way, new capabilities are added to the AP 3 in a virtual manner without requiring a hardware upgrade.

Access Point

Figure 2:
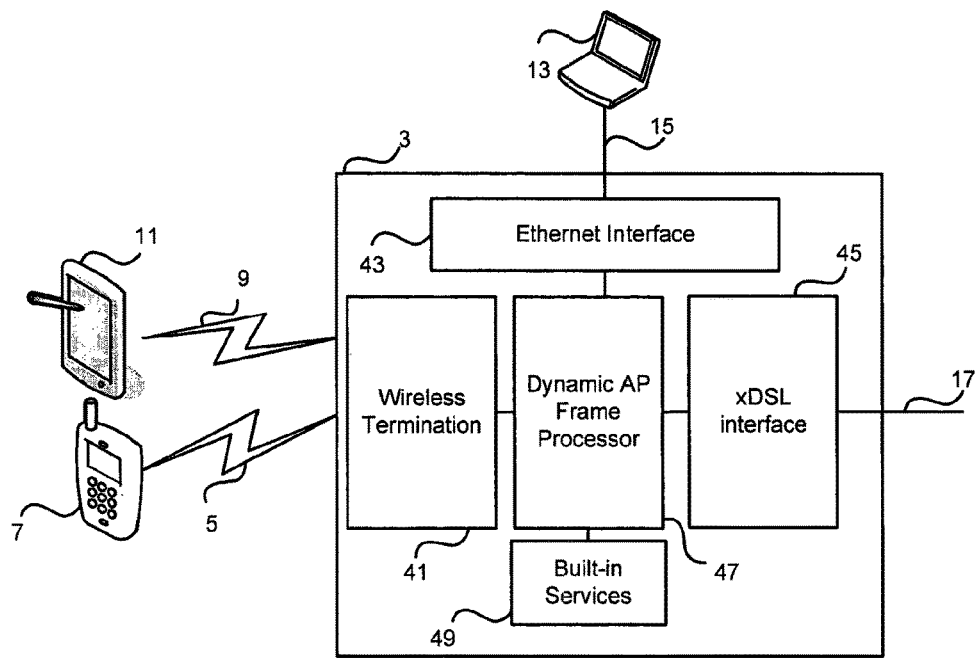
FIG. 2 schematically shows the components of an access point shown in FIG. 1.

FIG. 2 shows the functional components of an AP 3 in more detail.

The access point 3 contains a wireless termination 41 component for establishing private and public wireless networks, an Ethernet interface 43 for communication with devices on the local wired LAN, and an xDSL interface 45 for external communication with the network core.

An Access point dynamic frame processor 47 controls the flow of data packets between the various interfaces and in particular determines whether control functions are performed locally based on a set of in built services 49 or are carried out by the dynamic controller 31 on the network core.

As mentioned earlier, there are various access points 3 in the ISP network and therefore their capabilities will vary based on hardware differences. Generally older devices will support less functions or be unable to perform certain functions sufficiently quickly enough to meet Quality of Service requirements, etc., and therefore are more reliant on the dynamic Wi-Fi control offload capability.

Access Point

Figure 3:
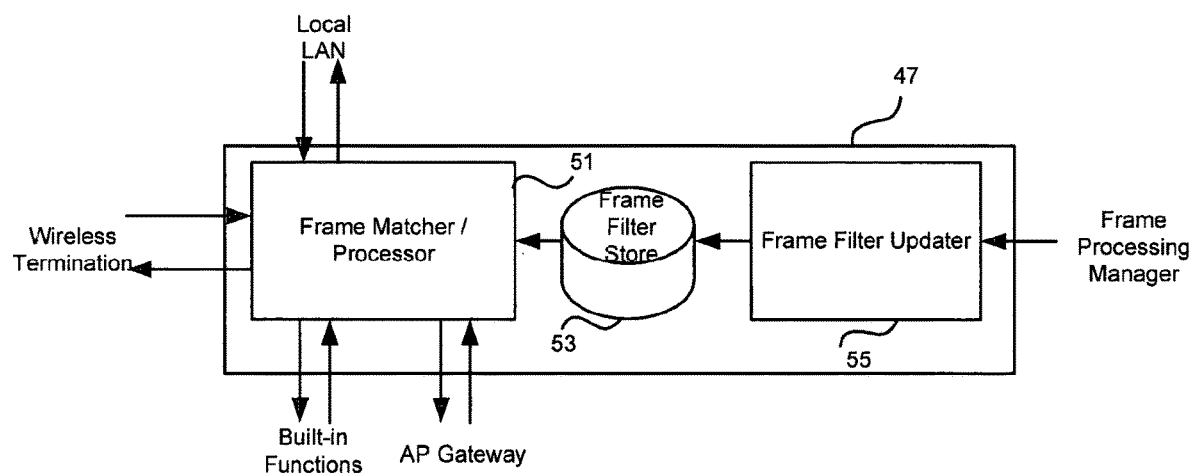
FIG. 3 schematically shows the functional components of the dynamic frame processor illustrated in FIG. 2.

FIG. 3 shows the functional components of the AP dynamic frame processor 47 in more detail. A Frame matcher 51 is responsible for inspecting each packet that is received from any of the interfaces and forwarding the packet to the appropriate destination. Control plane packets related to a particular service or device setup are directed either to the local in-built services 49 if the AP 3 supports the required function, or to the controller dynamic frame processor 35 via the AP gateway 23 for remote processing if the AP 3 cannot process the request. Data packets between devices located on the private Wi-Fi network and on the Ethernet are routed locally while data packets for external networks are sent to the AP gateway 23 for subsequent routing.

The routing function of the frame matcher 51 is determined by a set of rules stored in the frame filter store 53. In accordance with the first embodiment, the rules governing the function of the frame matcher 51 are decided and received from the Frame processing manager 33.

The frame processing manager 33 determines which rules are delivered to the frame filter store 53 based on the capabilities of the AP. Furthermore the information in the frame filter store is not static and can be updated during the operation of the AP 3 rather than simply being set once at device start up.

In this embodiment, the AP 3 and frame processing manager 33 communicate regularly to provide functionality to the AP 3 during use, for example by supplying new control software in the form of firmware, adding new routing functions for the AP 3 to perform locally, or providing rules to forward packets to the controller dynamic frame processor for remote processing.

Network Core

As mentioned above, the dynamic WLAN controller 31 maintains a list of the capabilities of each connected AP's in-built routing functions and a list of virtualized functions that the APs can offload to the controller dynamic frame processor 35 in order to gain that functionality without a hardware update. In order to maintain the validity of the network status, the dynamic Wi-Fi controller 31 must periodically check the stored values are valid and update the behavior of the AP dynamic frame processor 47 to process locally or offload as necessary.

Further functions of the frame processing manager 33 are to groups the sets of APs 3 into common functionality groups, send updates when a new software/firmware which may change the processing of the APs 3 is available and to update the behavior of the APs 3 when new network functions are available.

Figure 4:
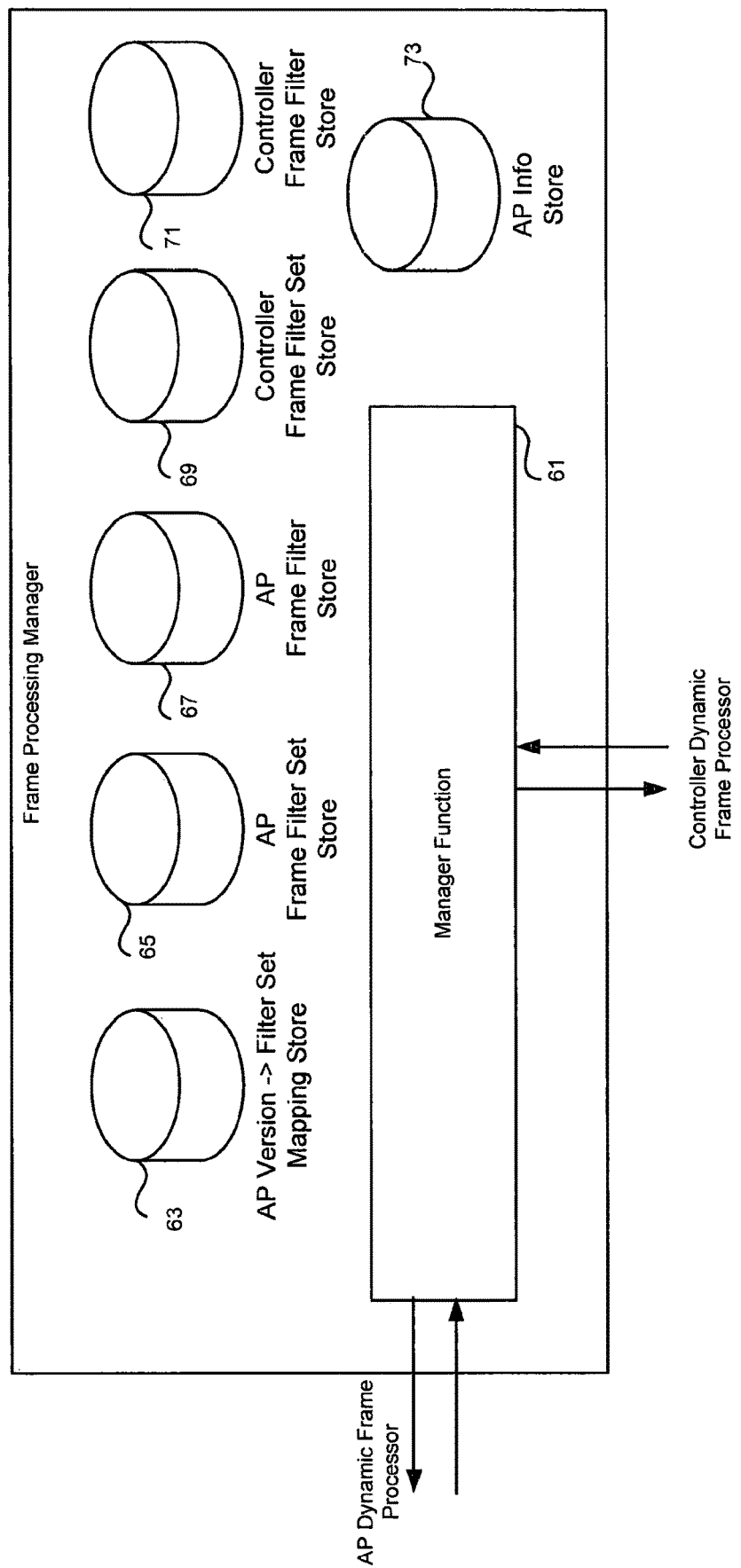
FIG. 4 schematically shows the function components of the frame processing manager illustrate in FIG. 1.

FIG. 4 shows the functional components of the frame processing manager 33. As shown, the frame processing manager 33 contains a number of data stores and a manager function 61 for combining the stored data to arrive at a decision on how to configure each access point 3. The data stores are:

AP version->filter set mapping store 63;
AP frame filter set store 65;
AP frame filter store 67;
Controller Frame filter set store 69;
Controller frame filter store 71; and
AP info store 73.

Table 1 below shows example contents of the AP Version->Filter Set Mapping Store 63. This store allows the frame processing manager 33 to know which AP Frame Filters it should download to any given AP, and which Controller Frame Filter Set to use with that AP Version.

TABLE 1

AP Version -> Filter Set Mapping Store

| AP Version Unique ID | AP Hardware Version | AP Firmware Version | AP Frame Filter Set ID | Controller Frame Filter Set ID |
|---|---|---|---|---|
| APV1 | 1.0 | 1.1.0 | APFFS1 | CFFS1 |
| AAV2 | 1.0 | 1.2.0 | APFFS2 | CFFS2 |
| APV3 | 2.0 | 2.1.0 | APFFS2 | CFFS3 |
| APV4 | 3.0 | 3.1.0 | APFFS3 | CFFS4 |

Table 2 shows an example of the AP Info Store 73 which maintains the mapping between individual APs, which version of AP they are, and what filter set is currently loaded in them.

TABLE 2

AP Info Store

| AP ID (MAC Address) | AP Version ID | Last Updated AP Frame Filter Set ID |
|---|---|---|
| 00:00:DB:11:22:33 | APV1 | APFFS1 |
| 00:00:DB:1F:DD:07 | APV1 | APFFS1 |
| 00:00:DB:20:01:F4 | APV2 | APFFS2 |
| . . . | . . . | . . . |

Table 3 shows and example AP Frame Filter Set Store 65 which defines which AP Frame Filters are in which AP Frame Filter Set.

TABLE 3

AP Frame Filter Set Store

| AP Frame Filter Set ID | AP Frame Filter Set |
|---|---|
| APFFS1 | APFF1, APFF2, APFF3, APFF4 |
| APFFS2 | APFF2, APFF3, APFF4 |
| APFFS3 | APFF5, APFF6 |
| . . . | . . . |

Table 4 shows an example of the AP Frame Filter Store 67, which stores the definition of each of the AP Frame Filters. Examples of the Filter Criteria and Actions are given later in the worked examples.

TABLE 4

AP Frame Filter Store

| AP Frame Filter ID | Filter Criterion | Action |
|---|---|---|
| APFF1 | See examples below | See examples below |
| APFF2 | See examples below | See examples below |
| APFF3 | See examples below | See examples below |
| APFF4 | See examples below | See examples below |
| APFF5 | See examples below | See examples below |
| APFF6 | See examples below | See examples below |
| . . . | . . . | . . . |

Table 5 shows an example of the Controller Frame Filter Set Store 69 which defines which Controller Frame Filters are in which Controller Frame Filter Set.

TABLE 5

Controller Frame Filter Set Store

| Controller Frame Filter Set ID | Controller Frame Filter Set | Comment: AP Version this applies to (defined in AP Version -> Filter Set Mapping Store) |
|---|---|---|
| CFFS1 | CFF1, CFF2, CFF3 | APV1 |
| CFFS2 | CFF2, CFF3, CFF4 | APV2 |
| CFFS3 | CFF5, CFF6 | APV3 |
| CFFS4 | CFF6 | APV4 |
| ... | ... | ... |

Table 6 shows an example of the Controller Frame Filter Store 71 which defines the frame filters used on the controller.

TABLE 6

Controller Frame Filter Store

| Controller Frame Filter ID | Filter Criterion | Action | Comment: New Controller Functions Used |
|---|---|---|---|
| CFF1 | Similar to AP functions | ... | Function 1 |
| CFF2 | Similar to AP functions | ... | — |
| CFF3 | Similar to AP functions | ... | — |
| CFF4 | Similar to AP functions | ... | Function 2 |
| CFF5 | Similar to AP functions | ... | Function 3 |
| CFF6 | Similar to AP functions | ... | — |
| ... | ... | ... | ... |

Figure 5:
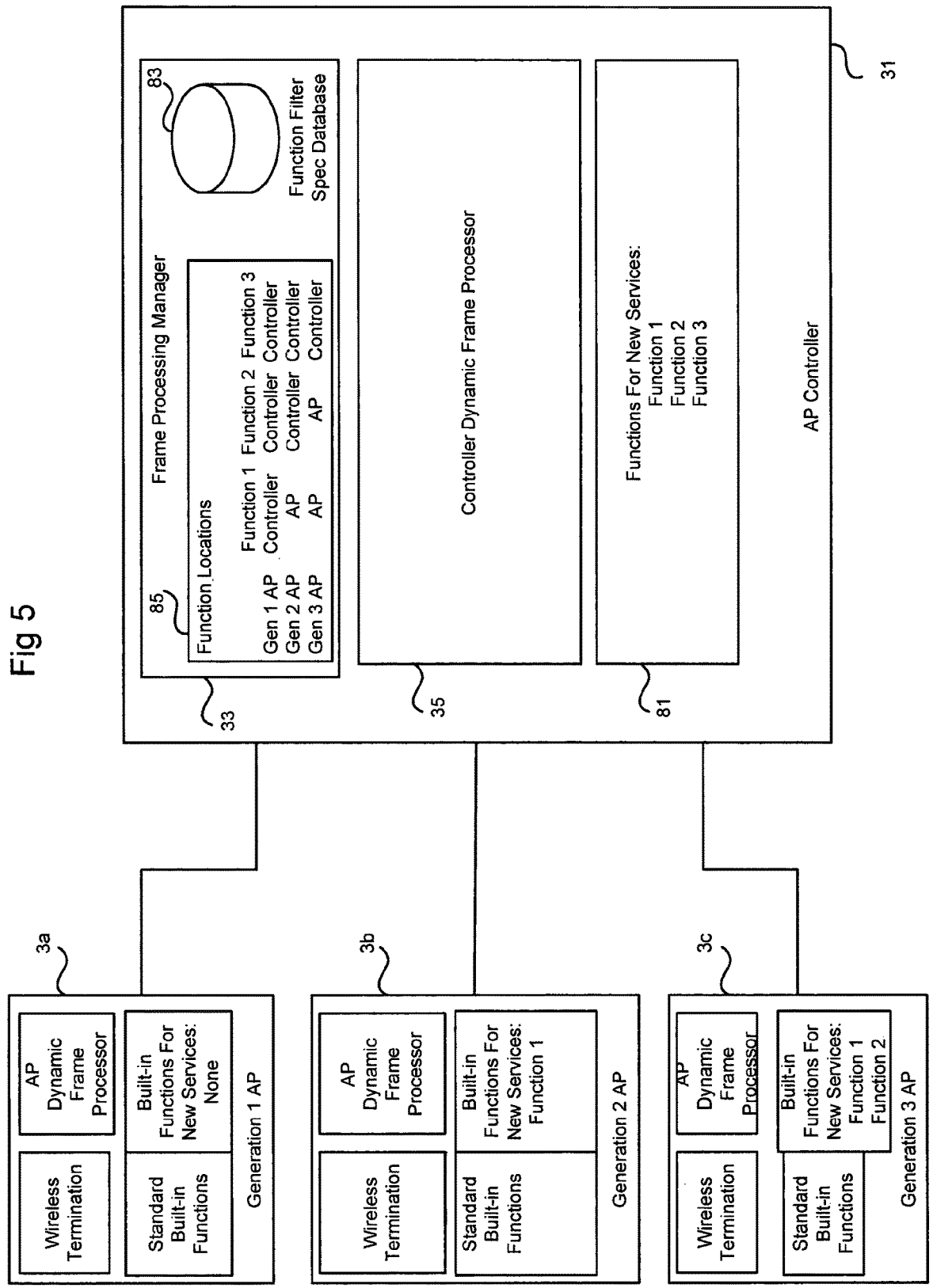
FIG. 5 schematically shows an example configuration where a controller dynamic frame processor performs different functions for different access points in the network.

FIG. 5 shows another view of the network components to an example configuration in relation to three generations of AP 3 and three network functions 81.

As shown in FIG. 5, the frame processing manager 33 has determined that for the three new services, the first generation AP 3a will off-load processing for all three functions to the controller dynamic frame processor 35, the second generation AP 3b can locally process function 1 and therefore it only needs to offload functions 2 and 3, finally the third generation AP 3 has in-build processing for functions 1 and 2 and so only needs to offload function 3.

EXAMPLES

Example operations of the access points 3 and the dynamic controller 31 will now be described relating to AP 3 registrations, firmware updates, adding new functions to the AP 3 and updating the AP 3 to handle new functions that are available via remote processing by the controller dynamic frame processor 35.

Example Operation 1: Access Point Registration

Initial Configuration of AP:
When a new access point 3 is added to the network 1, the frame processing manager 33 must become aware of it, and configure it appropriately based on the capabilities of the AP 3.
1. The AP 3 is configured in the factory with the domain name of the frame processing manager 33.
2. As explained above, the frame processing manager 33 is configured with a database which lists the hardware and firmware versions of all the APs with which it can configure. Associated with each combination of hardware/firmware versions is a list of filter specifications relevant for that version.
3. When the AP 3 is connected to the network 19, it performs a DNS lookup of the frame processing manager's 33 domain name and finds the IP address of the frame processing manager 33.
4. The AP 3 then contacts the frame processing manager 33 and registers, identifying its hardware and firmware versions and the (currently empty) list of existing frame filter identifiers currently loaded.
5. The Frame Processing Manager 33 performs a database lookup on the AP hardware/firmware version combination and identifies a set of filter specifications suitable for that AP.
6. The Frame Processing Manager 33 sends the selected set of filter specifications down to the AP 3.
7. The AP Frame Filter Updater 55 receives the list of filter specifications and loads them into the frame filter store 53.
8. The AP 3 then confirms to the frame processing manager 33 that the filters have been loaded successfully. This completes the registration phase.
9. The frame processing manager 33 then performs the usual AP configuration steps known in the prior art (e.g. SSID configuration).

In this registration operation, the frame processing manager 33 and access point 3 interact in order to register and exchange configuration information so that the appropriate set of functions for the AP 3 hardware are delivered to the AP 3.

Example 1a: Firmware Version Change (Upgrade or Downgrade)

If at a later date, a new version of firmware becomes available for the AP 3, the frame processing manager 33 on the controller allows the new firmware to be distributed to (potentially a selection of) those compatible APs 3.
1. A new software version becomes available.
2. The data stores on the frame processing manager 33 are updated. (AP Version->AP Filter Set Mapping Store; AP Frame Filter Set Store; AP Frame Filter Store; Controller Frame Filter Set Store; Controller Frame Filter Store)
3. The operator of the frame processing manager 33 selects which of the compatible APs to upgrade.
4. The frame processing manager 33 sends the new firmware to each of the selected APs 3.
5. Each AP 3 installs the new firmware and re-initiates the registration process above.
6. The registration process proceeds as above, except that the AP 3 now lists its existing set of filters in the registration request, and the frame processing manager 33 responds with a set of additional filters and a list of filters to remove depending on the new functionality of the firmware update.

If the owner of an AP 3 replaces the existing AP 3 with a different model, the process "Initial AP Configuration" will be followed.

The above processing shows how the status tables relating to the APs 3 are updated and used to maintain information on the different APs 3.

The following examples below show the operation of the invention as new services are added to the APs.

Example Operation 2: New Service is SSID Prioritization

In this example, when a new service is identified which the current access points 3 do not support, the existence of the new function and updated behavior must be sent to the access points 3 by the frame processing manager 33. In this way the configuration of the APs 3 can be dynamically changed in response to the presence of a new service or function.

The processing for the addition of a new service to support SSID prioritization will be described. This function allows an access point, which supports both public and private wireless networks, to prevent devices which have valid credentials for the private side from connecting to the public side. This is to be achieved by not responding to probe requests on the public side from devices which have connected to the private side.

Two possible ways of implementing this new functionality according to the first embodiment are shown below:
Implementation 1a: (Controller Actively Involved)
1. In this implementation, a new function "Private-Side-Tracker" is written for the frame processing manager 33 by a system administration, which can generate new filter criteria for the AP 3 on the basis of received frames from the AP 3.
2. The "Private-Side-Tracker" function is added to the frame processing manager 33.
3. An initial set of new filter criteria are also provided for the AP 3.
Initial filter criteria for the AP 3:

5. Sometime later, the client device 7 attempts to connect to the private network side of AP 3. The AP 3 does not find a match to either filter criterion and will respond normally with a probe response.
6. Assuming the client 7 subsequently presented the correct credentials and is therefore allowed onto the private side network 5, the AP 3 would generate an Access-Accept frame for that client 7. At this point, filter F1_PRIVATE_AUTH would match (as the client's 7 MAC address is not yet in the Destination MAC exclusion list). The AP 3 duplicates the frame up to the frame processing manager 33 and processes the frame as normal. The client 7 will in due course be allowed onto the private side network 5.
7. When the authentication frame is received at the frame processing manager 33, it is intercepted by the new "Private-Side-Tracker" function. (This interception could be implemented by a similar filter matching process as described above for the AP, where the frame processing manager 33 applies a specific of controller frame filter set, dependent on the AP version.) The "Private-Side-Tracker" function identifies the AP 3 associated with the frame and the Destination MAC address "x" in the frame. It creates then sends three filter update commands down to the AP 3:
Update (F1_PRIVATE_AUTH, Destination MAC, not in set, add, x)
Update (F2_PUBLIC_IGNORE, Add, Source MAC, in set, add, x)
Update (F3_PRIVATE_AUTH_REJECT, Destination MAC, not in set, add, x)

TABLE 7

| Filter Id | Filter Criterion | Action |
|---|---|---|
| F1_PRIVATE_AUTH (Unique filter identifier) | Packet direction: outbound to air<br>Wireless network: Private<br>Frame type: Management - Access-Accept<br>Destination MAC: not in set { } | Match: Duplicate packet to controller and process as normal<br>No Match: Process as normal |
| F2_PUBLIC_IGNORE | Packet direction: inbound from air<br>Wireless network: Public<br>Frame type: Management - Probe Request<br>Source MAC: in set { } | Match: Ignore packet - do not process as normal<br>No Match: Process as normal |
| F3_PRIVATE_AUTH_REJECT | Packet direction: outbound to air<br>Wireless network: Private<br>Frame type: Management - Access-Reject<br>Destination MAC: in set { } | Match: Duplicate packet to controller and process as normal<br>No Match: Process as normal |

4. Once the new filters associated with the private side tracker function have been loaded, the AP 3 is ready to apply the functionality. A Wi-Fi client 7 initially attempts to connect to the public network side of AP 3. It initially sends out a probe request to the public network SSID 9. The frame matcher 51 determines that neither filter criterion matches and therefore the AP 3 responds with a probe response, and the client 7 then connects successfully to the public network 9.

In an alternative, the frame processing manager 33 could create new replacement filters itself, rather than filter update commands. However, the preferred method has the advantage that the frame processing manager 33 does not have to maintain state for all the APs.

The frame filter updater 55 of the AP 3 receives the two filter update commands into the frame filter store 53 and the frame matcher 51 processes them, after which its filter table 53 looks as follows:

TABLE 8

| Filter Id | Filter Criterion | Action |
|---|---|---|
| F1_PRIVATE_AUTH (Unique filter identifier) | Packet direction: outbound to air<br>Wireless network: Private<br>Frame type: Management - Access-Accept<br>Destination MAC: not in set {x} | Match: Duplicate packet to controller and process as normal<br>No Match: Process as normal |
| F2_PUBLIC_IGNORE | Packet direction: inbound from air<br>Wireless network: Public<br>Frame type: Management - Probe Request<br>Source MAC: in set {x} | Match: Ignore packet - do not process as normal<br>No Match: Process as normal |
| F3_PRIVATE_AUTH_REJECT | Packet direction: outbound to air<br>Wireless network: Private<br>Frame type: Management - Access-Reject<br>Destination MAC: in set {x} | Match: Duplicate packet to controller and process as normal<br>No Match: Process as normal |

8. When the same client 7 again attempts to connect to the private network side. This time the F1_PRIVATE_AUTH does not match as the filter criterion "Destination MAC: not in set {x}" is now false. The AP 3 therefore does not duplicate the frame to the frame processing manager 33, but just processes it as normal. (This avoids the frame processing manager 33 having to repeatedly performing task step 6 above.)

9. If the client 7 attempts to connect to the public network side 9 of the AP 3. It initially issues a Probe Request to the AP 3.

10. This Probe Request now matches F2_PUBLIC_IGNORE, and the AP 3 performs the match action, which is to ignore the frame.

11. The client 7 therefore receives no Probe Response, as none was sent by the AP, and eventually gives up trying to connect to the public side 9 of the AP 3.

12. If the client 7 is ever removed from the authorization list on the private side of AP 3 (e.g. for EAP-TLS) (or WEP key changed on private SSID and client not updated), and then attempts to connect to the private side 5, the filter F3_PRIVATE_AUTH_REJECT will be matched, the frame will be sent up to the frame processing manager 33 which will send new filter updates to AP 3 removing "x" from the MAC address sets in the three rules, allowing the client 7 to connect once again to the public side 9.

Implementation 1b: (Controller not Actively involved)

An alternative implementation is very similar to implementation 1a, except that more advanced filter manipulation functions are used. In particular, the possible filter actions include the ability to modify filter criteria/actions (essentially self-modifying code). This allows all the functionality of this particular example service to be implemented directly on the AP with no involvement by the frame processing manager 33 (or possibly only involvement in deploying the initial filters).

TABLE 9

| Filter Id | Filter Criterion | Match Action |
|---|---|---|
| F1_PRIVATE_AUTH<br># filter id consists of a unique access point identifier and a filter identifier unique within that AP<br># This filter detects successful authentications on the private side of the AP, and adds the device's MAC address to a list of MACs not to be allowed on the public side | # WPA2-PSK<br>Authentication success on private side of AP<br>Packet direction: outbound to air<br>Wireless network: Private<br>Frame type: 802.11 Data<br>Type: 801.1X Authentication (0x888e)<br>Key Descriptor Type: EAPOL RSN Key (2)<br>Key Information:<br>Secure: Set<br>Destination MAC: not in set { } | Process as normal and perform edits:<br>(F1_PRIVATE_AUTH, Destination MAC, not in set, add, <Destination MAC>)<br>(F2_PUBLIC_IGNORE, Add, Source MAC, in set, add, <Destination MAC>))<br>(F3_PRIVATE_AUTH_REJECT, Destination MAC, not in set, add, <Destination MAC>))<br>where <Destination MAC> is extracted from the matched frame. |
| F2_PUBLIC_IGNORE<br># This filter ensures that specified device MAC addresses do not receive Probe Responses on the public side | Packet direction: inbound from air<br>Wireless network: Public<br>Frame type: 802.11 Probe Request (0x04)<br>Source MAC: in set { } | Ignore packet - do not process as normal |
| F3_PRIVATE_AUTH_REJECT<br># This filter ensures that devices which are no longer authorized authorised on the private side are allowed onto the public side. | Packet direction: outbound to air<br>Wireless network: Private<br>Frame type: 802.11 Deauthentication (0x0c);<br>Reason Code: Previous | Process as normal and perform edits:<br>(F1_PRIVATE_AUTH, Destination MAC, not in set, remove, <Destination MAC>)<br>(F2_PUBLIC_IGNORE, Add, |

TABLE 9-continued

| Filter Id | Filter Criterion | Match Action |
|---|---|---|
| | authentication no longer valid (0x0002) Destination MAC: in set { } | Source MAC, in set, remove, <Destination MAC>)) (F3_PRIVATE_AUTH_REJECT, Destination MAC, not in set, remove, <Destination MAC>)) where <Destination MAC> is extracted from the matched frame. |

The above processing allows the AP 3 to be upgraded with new behavior and functions based on the filtering and behavior rules provided by the Frame Processing Manager 33

Example Operation 3: New Service is Wi-Fi Alliance "Passpoint" (a.k.a. Hotspot 2.0)

In this example, a new service is identified which the access points 3 do not currently support. For this example, the new service is to make the AP 3 Wi-Fi Alliance (WFA) Passpoint compliant. Passpoint is a certification program of the Wi-Fi Alliance designed to make Wi-Fi Roaming simpler.

As with the previous example, the detection of a new function causes the frame processing manager 33 to attempt to update the APs so that their capabilities can be dynamically changed in response to the new function. However, unlike the previous example, this new function cannot be simply effected by altering the AP 3. Therefore in this example, AP 3 is configured to send a subset of control data packets, relating to Passpoint in this example, to the controller dynamic frame processor 35 instead of trying to process the control packets itself. The controller dynamic frame processor 35 then functions as a proxy and processes the received control data on behalf of the AP 3. This processing is transparent to any Wi-Fi client devices and therefore the new function is implemented virtually for the AP 3 by the controller dynamic frame processor 35.

To support the Passpoint virtual function, the following changes need to be made to supplement existing AP functionality:
1. Beacon/Probe Response Frame Modifications:
   Add 802.11u and specific WFA extensions to the beacons and probe responses
2. Action Frame processing
   Add handling of 802.11u Action Frames, inbound and outbound A simplified sequence for connection to a Passpoint enabled AP is as follows:

1. A new "ANQP" function is written for the frame processing manager 33;
2. AP 3 is configured with Beacon Frame (and Probe Response Frame) information, and a set of frame filters;
3. AP 3 sends out Beacon Frame indicating it is Passpoint capable
4. Device 11 sends Probe Request to AP to check that two-way connectivity is possible.
5. AP 3 sends back a Probe Response indicating it is Passpoint capable
6. Device 11 sends ANQP query in an 802.11u Action Frame.
7. AP 3 responds with ANQP Response in 802.11u Action Frame indicating which Passpoint services are supported.
8. Device 11 decides whether to connect, and if so, connects using normal 802.1X/WPA2 Enterprise mechanisms.

The following text describes how this sequence of events is handled by the AP 3 and frame processing manager 33 of the dynamic Wi-Fi controller 31.
1. A new "ANQP" function is written for the frame processing manager 33
   A new function is written for the frame processing manager 33 to receive incoming ANQP queries from the client device 11 and produce responses to them.
2. AP is configured with Beacon Frame (and Probe Response Frame) information, and a set of frame filters
   By default, the AP 3 is not aware of Passpoint and does not know how to create a Passpoint compliant beacon frame. At the initialization phase for the AP 3, the frame processing manager 33 sends down a beacon (& probe response) configuration for the Passpoint enabled SSID. This includes a range of parameters (see standard CAPWAP) plus the definitions of two new elements, the 802.11u "Interworking" element and the Wi-Fi Alliance Hotspot 2.0 Vendor Specific information element.
   The frame processing manager 33 also sends down a set of frame filters to the AP 3 to cater for the 802.11u ANQP action frame processing.

TABLE 10

| Filter Id | Filter Criterion | Match Action |
|---|---|---|
| F4_ANQP_RECEIVE # This filter ensures that all inbound 802.11u GAS frames are forwarded to the controller | Packet direction: inbound from air Wireless network: Public Frame type = 802.11 Action (0x0d); Public Action in set {GAS Initial Request (0x0a), GAS Comeback Request (0x0d)} | Match: Encapsulate WLAN frame and forward to controller over Ethernet |

TABLE 10-continued

| Filter Id | Filter Criterion | Match Action |
| --- | --- | --- |
| F5_ANQP_RESPOND<br># This filter ensures that all outbound 802.11u GAS frames are put on the air | Packet direction: inbound from controller<br>Wireless network: Public<br>Frame type = Encapsulated Wireless LAN Management Frame;<br>Category Code = Public Action (4);<br>Public Action in set {GAS Initial Response (0x0a), GAS Comeback Response (0x0d)} | Match: Decapsulate WLAN frame from Ethernet frame and send out on air interface |

3. AP sends out Beacon Frame indicating it is Passpoint capable

The AP 3 configures the beacon based on this information and adds the SSID to its normal beacon broadcast cycle.

It also configures its probe response frames using the same information.

4. Device sends Probe Request to AP to check that two-way connectivity is possible.

A Passpoint enabled device detects the beacon, and determines from the beacon (specifically from the presence of the 802.11u Interworking Element and the Wi-Fi Alliance Hotspot 2.0 Vendor Specific information element) that the AP 3 is a Passpoint enabled AP. It decides to gather more information from the AP 3 to determine whether it should attempt to connect or not. It issues a probe request to the AP3.

5. AP sends back a Probe Response indicating it is Passpoint capable

The AP 3 sends back a probe response which includes the 802.11u "Interworking" element and the Wi-Fi Alliance Hotspot 2.0 Vendor Specific information element.

6. Device sends ANQP query in an 802.11u Action Frame

The device 11 then sends an 802.11u ANQP query to the access point 3 (contained in an Action Frame). This frame is matched by filter F4_ANQP_RECEIVE and is then encapsulated in an Ethernet frame and sent to the controller dynamic frame processor 35.

7. AP responds with ANQP Response in 802.11u Action Frame indicating which Passpoint services are supported.

The controller dynamic frame processor 35 knows how to handle this frame, using its new "ANQP" function. It processes it and produces an appropriate 802.11 response frame, which it encapsulates in an Ethernet frame (e.g. using CAPWAP) and passes it back to the AP 3.

The AP 3 receives the incoming frame, which is matched by filter F5_ANQP_RESPOND. It decapsulates the frame and sends it out over the air.

8. Device decides whether to connect, and if so, connects using normal 802.1X/WPA2 Enterprise mechanisms.

The device 11 receives the ANQP response and decides that the AP 3 does support a service provider for which it has a valid subscription. The ANQP process is now complete, and the device authenticates with the AP using normal WPA2 Enterprise mechanisms.

In this example, a new network function is added to the network which cannot be implemented simply by updating the behavior of the APs 3. Therefore the APs 3 are configured to offload the function to the controller dynamic frame processor 35 which carries out the processing on behalf of the AP 3.

The skilled person will appreciated that if the AP is replaced with a new AP which can locally carry out the new function, then during registration described above the ability of the new AP to carry out the Passpoint processing locally will be determined by the frame processing manager and therefore the AP dynamic frame processor is configured to carry out the Passpoint processing as an in-built function.

As shown above the system architecture in the first embodiment provides a mechanism to dynamically control the behavior of an Access Points 3 within an ISP's domain of APs 3. In particular, the interactions between the APs and the Dynamic Wi-Fi controller 31 allow many dynamic features such as:

determining and detecting changes in the set of APs;
  updating the software running on the APs dynamically;
  changing the behavior of the APs to provide more functionality and capability dynamically;
  changing the location where packets are processed to be dynamically moved from the Access Point to the Controller, or vice versa;
  allowing the manner in which packets are processed in the AP to be dynamically altered; and
  providing virtual functions to the existing capabilities of the AP.

Alternatives and Modifications

In the embodiment, the routers provide connectivity to customer premises devices to change the routing behavior and capabilities. It will be appreciated that the described processing is also applicable to other networks of devices such as a set top box network having a central controller location for administration and configuration functions.

In the embodiment, the routing devices have Wi-Fi interfaces. In an alternative, Ethernet only routers are similarly monitored and configured to add new capabilities.

In the embodiment, the wireless protocol used in the access point is a Wi-Fi protocol, in an alternative, the routers have other wireless technologies such as Bluetooth, femtocells and Wimax, and the dynamic controller is modified to include the management capability for any other wireless configurations.

In the embodiment, the access points were capable of creating private and public wireless networks, in one alternative, the access points only generate a private network and the dynamic controller is operable to configure the private network access points. In a further alternative, the access points do not create private wireless networks and are part of a "hotspot" network of public access points and the dynamic controller also functions to determine the capability of the various public access points and add functionality to each of them.

In the embodiment, a single dynamic controller is used to control all of the access points. In an alternative, for scalability and to account for system architecture variations, a plurality of dynamic controllers are present in the network core to handle subsets of access points.

The invention claimed is:

1. A wireless hotspot data network comprising:
   at least one wireless access point located at an edge of the wireless hotspot data network and configured to provide a first subset of functions from a set of control plane functions provided by the wireless hotspot data network to wireless network user devices located at the edge of the wireless hotspot data network, wherein the at least one wireless access point includes a wireless interface for wireless communication with wireless client devices, the wireless interface configured to create a private side wireless network and a public side wireless network;
   a wireless access point routing configuration controller located in a core of the wireless hotspot data network and operable to:
      determine, at the core of the wireless hotspot data network, the first subset of functions provided by the at least one wireless access point, and
      identify, at the core of the wireless hotspot data network, a second subset of functions from the set of control plane functions that are not in the first subset of functions; and
      a control data processor located in the core of the wireless hotspot data network and capable of processing the set of control plane functions,
   wherein the at least one wireless access point is configured to process, at the edge of the wireless hotspot data network, any requests for functions in the first subset of functions and to forward any requests relating to the second subset of functions to the control data processor located in the core of the wireless hotspot data network, and
   wherein the control data processor is configured, at the core of the wireless hotspot data network, to:
      receive, from the least one wireless access point, the second subset of functions,
      perform processing of the received second subset of functions on behalf of the at least one wireless access point, and
      return the results of the processing from the control data processor located at the core of the wireless hotspot data network to the at least one wireless access point located at the edge of the wireless hotspot data network.

2. A data network according to claim 1, wherein the second subset of functions of the at least one wireless access point results in new capabilities for the at least one wireless access point.

3. A data network according to claim 1, wherein at least one of the first subset of functions or the second subset of functions is dynamically changed whenever the wireless access point routing configuration controller determines new functions are available.

4. A data network according to claim 1, wherein there are at least two wireless access points devices having different processing capabilities, the wireless access point routing configuration controller determining the respective capabilities and configuring each of the at least two wireless access points to have a respective set of new capabilities.

5. A data network according to claim 1, wherein the wireless access point routing configuration controller detects the presence of new wireless access points and determines the respective configurations of the new wireless access points.

6. A network controller for a wireless hotspot data network, the network controller being located at a core of the wireless hotspot data network, comprising:
   an interface to a plurality of wireless access points comprising a first wireless access point and a second wireless access point,
   a control data processor located at the core of the wireless hotspot data network and capable of processing a set of functions; and
   a wireless access point routing configuration controller located at the core of the wireless hotspot data network and operable to:
      determine, at the core of the wireless hotspot data network, a first subset of functions from the set of functions capable of being processed by the first wireless access point, a second subset of functions from the set of functions capable of being processed by the second wireless access point, the first subset of functions being different than the second subset of functions, and
      identify, at the core of the wireless hotspot data network, a third subset of functions from the set of functions that are not in the first subset of functions and identify a fourth set of functions from the set of functions that are not in the second subset of functions,
   wherein the wireless access point routing configuration controller is operable to instruct:
      the first wireless access point to process, at the edge of the wireless hotpot data network, any requests for functions in the first subset of functions locally and to forward any requests relating to the third subset of functions to the control data processor located in the core of the wireless hotspot data network, and
      the second wireless access point to process, at the at the edge of the wireless hotpot data network, any requests for functions in the second subset of functions locally and to forward any requests relating to the fourth subset of functions to the control data processor located in the core of the wireless hotspot data network, and
   wherein the control data processor is configured, at the core of the wireless hotspot data network, to:
      receive from the first wireless access point the third subset of functions,
      receive from the second wireless access point the fourth subset of functions,
      perform processing of the received third subset of functions and fourth subset of functions on behalf of the first wireless access point and the second wireless access point, and
      return the results of the processing from the control data processor located at the core of the wireless hotpot data network to the first wireless access point and the second wireless access point located at the edge of the wireless hotspot data network.

7. A method of managing a wireless hotspot data network having at least one wireless access point located at an edge of the wireless hotspot data network, a wireless access point routing configuration controller located at a core of the wireless hotspot data network, and a control data processor located at the core of the wireless hotspot data network, the control data processor being capable of processing a set of functions, the method comprising:
   by the wireless access point routing configuration controller:

determining, at the core of the wireless hotspot data network, a first subset of functions from the set of functions that are provided by the at least one wireless access point, wherein the wireless access point includes a wireless interface for wireless communication with wireless client devices, the wireless interface configured to create a private side wireless network and a public side wireless network, identifying, at the core of the wireless hotspot data network, a second subset of functions from the set of functions that are not in the first subset of functions, and instructing the at least one wireless access point to process, at the edge of the wireless hotpot data network, any requests for functions in the first subset of functions locally and to forward any requests relating to the second subset of functions to the control data processor located in the core of the wireless hotspot data network; and by the control data processor:
receiving, at the core of the wireless hotspot data network, requests relating to the second subset of functions on behalf of the at least one wireless access point, performing processing, at the core of the wireless hotspot data network, of the received requests, and returning results of the processing from the core of the wireless hotspot data network to the at least one wireless access point located at the edge of the wireless hotspot data network.

8. A method according to claim 7 further comprising detecting the presence of new wireless access points and determining the respective configurations of the new wireless access points.

\* \* \* \* \*